United States Patent
Harper et al.

(10) Patent No.: US 8,195,901 B2
(45) Date of Patent: Jun. 5, 2012

(54) FIREHOSE DUMP OF SRAM WRITE CACHE DATA TO NON-VOLATILE MEMORY USING A SUPERCAP

(75) Inventors: Michael L. Harper, Tucson, AZ (US);
Craig A. Klein, Tucson, AZ (US);
Gregg S. Lucas, Tucson, AZ (US);
Mary A. J. Marquez, Tucson, AZ (US);
Robert E. Medlin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/365,923

(22) Filed: Feb. 5, 2009

(65) Prior Publication Data
US 2010/0199021 A1    Aug. 5, 2010

(51) Int. Cl.
*G06F 13/16* (2006.01)
(52) U.S. Cl. ........ 711/162; 711/103; 711/112; 711/166; 711/E12.083
(58) Field of Classification Search .................. 711/103, 711/162, 112, 166
See application file for complete search history.

(56) References Cited

U.S. PATENT DOCUMENTS

| | | | |
|---|---|---|---|
| 5,563,839 A | 10/1996 | Herdt et al. | |
| 5,596,708 A | 1/1997 | Weber | |
| 6,476,996 B1 * | 11/2002 | Ryan | 360/75 |
| 6,687,627 B1 | 2/2004 | Gunn et al. | |
| 7,107,480 B1 | 9/2006 | Moshayedi et al. | |
| 2003/0200382 A1 * | 10/2003 | Wells et al. | 711/106 |
| 2005/0117418 A1 * | 6/2005 | Jewell et al. | 365/202 |
| 2005/0246487 A1 * | 11/2005 | Ergan et al. | 711/113 |
| 2007/0220227 A1 * | 9/2007 | Long | 711/165 |
| 2008/0034259 A1 | 2/2008 | Ko et al. | |
| 2008/0122484 A1 | 5/2008 | Zhu et al. | |

FOREIGN PATENT DOCUMENTS

JP        62256296        11/1987

* cited by examiner

*Primary Examiner* — Kenneth Lo
(74) *Attorney, Agent, or Firm* — Farancis Lammes; Stephen J. Walder, Jr.; Randall J. Bluestone

(57) ABSTRACT

A mechanism is provided for firehose dumping modified data in a static random access memory of a hard disk drive to non-volatile memory of the hard disk drive during a power event. Responsive an indication of a power event in the hard disk drive, hard disk drive command processing is suspended. A token is set in the non-volatile storage indicating that flash memory in the non-volatile memory contains modified data. A portion of a static random access memory cache table containing information on the modified data in the static random access memory is copied to the flash memory. The modified data from the static random access memory is then copied to the flash memory. Responsive to a determination that the power event that initiated the copy of the modified data in the static random access memory to the flash memory is still present, the hard disk drive is shut down.

20 Claims, 7 Drawing Sheets

FIREHOSE DUMP OF SRAM WRITE CACHE DATA TO NON-VOLATILE MEMORY USING A SUPERCAP

BACKGROUND

The present application relates generally to an improved data processing apparatus and method, and more specifically to an apparatus and method for using a supercap for a firehose dump of SRAM write cache data to non-volatile memory.

A hard disk drive (HDD), commonly referred to as a hard drive, hard disk, or fixed disk drive, is a non-volatile storage device which stores digitally encoded data on rapidly rotating platters with magnetic surfaces. Strictly speaking, "drive" refers to a device distinct from its medium, such as a tape drive and its tape, or a floppy disk drive and its floppy disk. Early HDDs had removable media; however, an HDD today is typically a sealed unit (except for a filtered vent hole to equalize air pressure) with fixed media.

In today's hard disk drive storage (HDD), data is typically stored on multiple media types before being written on the disk, depending on the types of data, the relative frequency of access, and to improve system performance. In today's HDD, a memory cache is incorporated as a means of increasing the performance of the storage system, so that a portion of the data can be kept in the faster accessed memory. This is typically implemented with static random access memory (SRAM) technology, which is relatively cheap and fast; however, SRAM is volatile so that the user is forced to either ensure that data that is written to the HDD are safely stored on the disk in the event of a power or component failure, which means that writes to the disk are significantly slower than if they are cached, or to cache the written data and write them to the media later, risking possible data loss.

SUMMARY

In one illustrative embodiment, a method, in a data processing system, is provided for firehose dumping modified data in a static random access memory of a hard disk drive to non-volatile memory of the hard disk drive during a power event. The illustrative embodiment receives an indication of the power event in the hard disk drive. The illustrative embodiment suspends command processing in the hard disk drive. The illustrative embodiment sets a token in the non-volatile storage indicating that a flash memory in the non-volatile memory contains the modified data. The illustrative embodiment copies a portion of a static random access memory cache table containing information on the modified data in the static random access memory to the flash memory. The illustrative embodiment copies the modified data from the static random access memory to the flash memory. The illustrative embodiment determines if the power event that initiated the copy of the modified data in the static random access memory to the flash memory is still present. The illustrative embodiment shuts down the hard disk drive in response to the power event that initiated the copy still being present.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
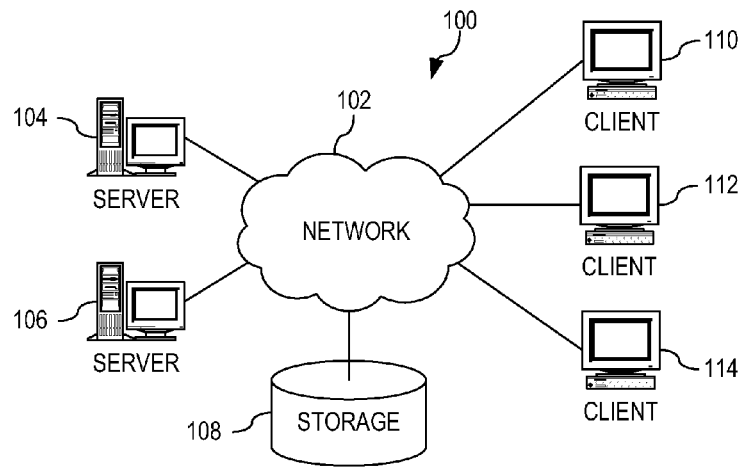
FIG. 1 depicts a pictorial representation of an example distributed data processing system in which aspects of the illustrative embodiments may be implemented.

The illustrative embodiments provide a mechanism for using a supercap to perform a firehose dump of static random access memory (SRAM) write cache data to non-volatile memory. Flash technology has been in use for a relatively long period of time, but flash technology suffers from several shortcomings, including a relatively long write cycle and a phenomenon known as write wear-out. By incorporating an array of flash controllers and an array of Flash chips, a non-volatile store (NVS) may be constructed that provides high speed access with data security to do a fire hose dump of the write data that remain in the SRAM memory cache. A super capacitor is used to keep power to the processor, SRAM memory cache, and the Flash while the fire hose dump is completed. The use of flash controllers and Flash chips improves performance of the Redundant Array of Inexpensive Disks (RAID) Controller while maintaining the security of the data written to the SRAM cache but not yet written to the disk.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for using a supercap to perform a firehose dump of static random access memory (SRAM) write cache data to non-volatile memory. The illustrative embodiments incorporate an array of Flash controllers and an array of Flash chips to construct a nonvolatile store (NVS) that provides high speed access with data security to do a fire hose dump of the write data that remain in the SRAM memory cache. The illustrative embodiments use a super capacitor to keep power to the processor, SRAM memory cache, and the Flash chips while the fire hose dump is completed.

Figure 2:
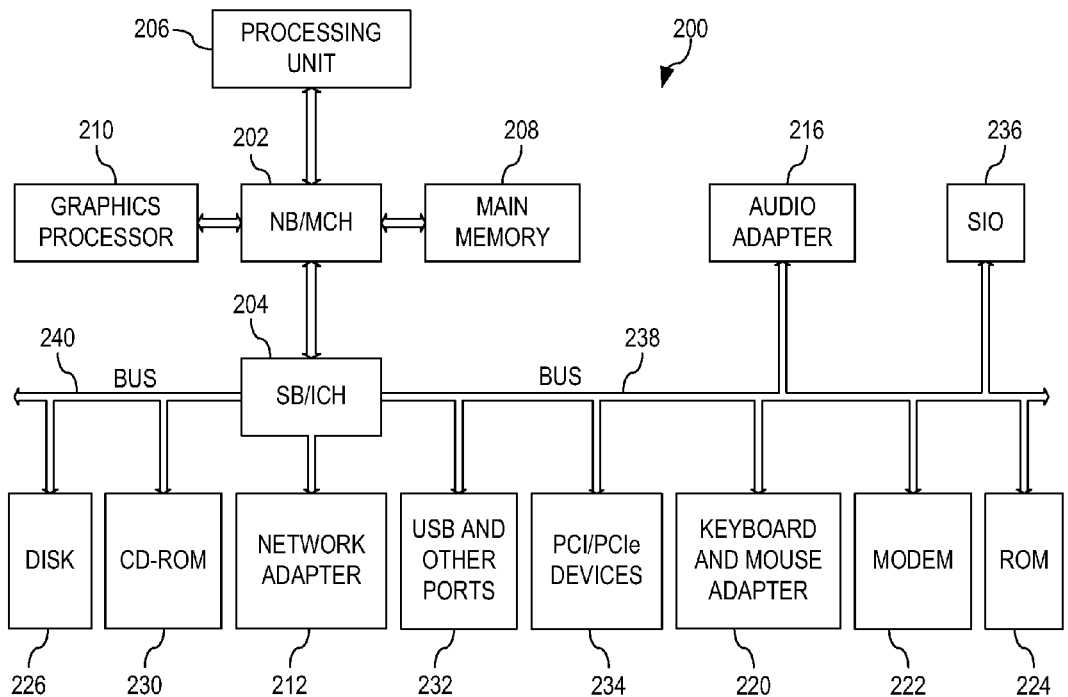
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation firehose dumping mechanism that uses a supercap to firehose dump of static random access memory (SRAM) write cache data to non-volatile memory, this is only an example and is not intended to state or imply any limitation with regard to the features of the present invention. To the contrary, the illustrative embodiments are intended to include distributed data processing environments and embodiments in which a firehose dump of static random access memory (SRAM) write cache data to non-volatile memory may be performed.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
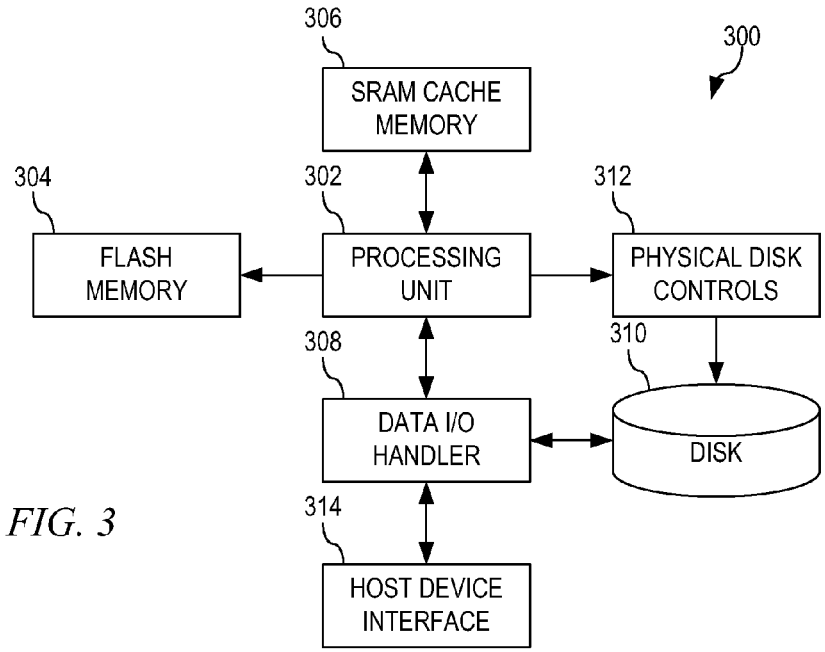
FIG. 3 depicts an example schematic view of a typical hard disk drive in accordance with an illustrative embodiment.

FIG. 3 depicts an example schematic view of a typical hard disk drive in accordance with an illustrative embodiment. Hard disk drive (HDD) 300 comprises processor 302, flash memory 304, static random access memory (SRAM) cache memory 306, data I/O handler 308, rotating magnetic disk 310, physical disk controls 312, and host device interface 314. Flash memory 304 is non-volatile computer memory that can be electrically erased and reprogrammed. Flash memory 304 is non-volatile, which means that no power is needed to maintain the information stored in the chip. Flash memory 304 stores instruction code executed by processor 302. Data I/O handler 308 acts as a conduit for data and commands between the internal components of HDD 300. Physical disk controls 312 controls the reading and writing of data to rotating magnetic disk 310. Host device interface 314 transfers digital information signals between a host device and data I/O handler 308 of HDD 300. Data I/O handler 308 passes commands, messages, and status between host device interface 314 and processing unit 302, and passes data between host device interface 314 and rotating magnetic disk 310.

SRAM cache memory 306 provides temporary storage for data that is accessed repeatedly, so that the overall read performance is increased for said data, as the mechanical delays associated with reading the data from the rotating magnetic disk are mitigated. SRAM cache memory 306 is also often used as a write-through cache, meaning that data is written to SRAM cache memory 306 and then written to rotating magnetic disk 310 later when convenient, again reducing the delay associated with accessing rotating magnetic disk 310. This comes with a risk; however, in that SRAM cache memory 306 is volatile, and any data that is written to SRAM cache memory 306 and not yet written to rotating magnetic disk 310 (referred to subsequently as modified data) are susceptible to loss or corruption due to power loss or interruption. Because rotating magnetic disk 310 needs to rotate at a constant velocity during the write process, and because the write process is relatively slow, it is not practical to attempt to write any modified data to the disk after a power loss.

Figure 4:
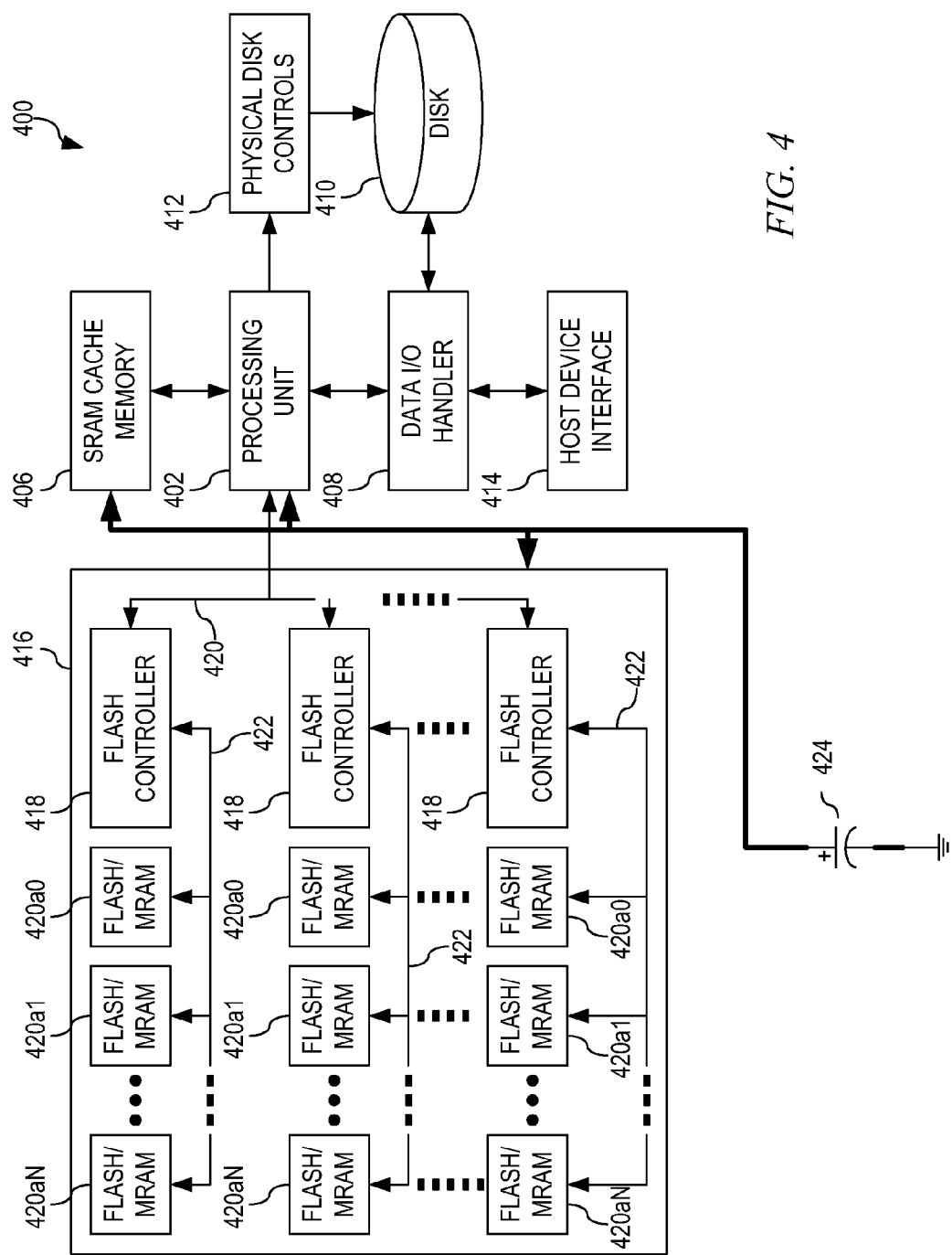
FIG. 4 depicts an example of an improved hard disk drive in accordance with an illustrative embodiment.

FIG. 4 depicts an example of an improved hard disk drive in accordance with an illustrative embodiment. Similar to HDD 300 of FIG. 3, hard disk drive (HDD) 400 comprises processor 402, static random access memory (SRAM) cache memory 406, data I/O handler 408, rotating magnetic disk 410, physical disk controls 412, and host device interface 414. Data I/O handler 408 acts as a conduit for data and commands between the internal components of HDD 400. Data I/O handler 408 passes commands, messages, and status between host device interface 414 and processing unit 402, and passes data between host device interface 414 and rotating magnetic disk 410. Physical disk controls 412 control movement of the mechanical elements of rotating magnetic disk 410 during the reading and writing of data. Host device interface 414 transfers digital information signals between a host device and data I/O handler 408 of HDD 400.

As opposed to HDD 300 of FIG. 3, HDD 400 replaces the flash memory with non-volatile storage (NVS) 416. NVS 416 comprises several flash controllers 418 and several flash memories 420$a$0, 420$a$1, through 420$a$N. While some hybrid drives use flash memories and rotating magnetic disks, the use of flash memories in hybrid drives is currently limited to the extent that the flash memory is used to store data that rarely change, due to the inherent write wear-out problems associated with flash technologies. Typically, the operating system must be hybrid drive aware and load only data or applications that meet certain criteria into the flash memory. This technique is known as Intelligent Data Placement, and it severely limits the usage of the hybrid drive. An advantage of a hybrid drive is that the hybrid drive allows the rotating magnetic disk to be powered down intermittently and the flash used to buffer data until it becomes necessary to write or read from the disk. However, the current use of hybrid drives is only practical in certain environments where power savings are paramount. Generally, high performance systems can not wait for disk spin-up in order to access data or programs that are not cached, and so the hybrid drive is not practical in many situations. Even the hybrid drives cannot cache often-modified data or seldom used applications. Consequently, SRAM storage, such as SRAM cache memory 406, is still employed to boost the performance of the typical HDD.

Hence, the illustrative embodiments employ several flash memories 420$a$0, 420$a$1, through 420$a$N as a cache, similar to a hybrid drive, it is fundamentally different in the usage model associated with the resultant NVS 416. Flash controllers 418 may be coupled to flash memories 420$a$0, 420$a$1, through 420$a$N by parallel read/write bus 422 with address, data, and control lines. In one embodiment, bus 422 may be a parallel flash bus. Flash controllers 418 are connected to processor 402 via internal bus 420. In one embodiment, internal bus 420 may be a PCI-E bus. The depicted architecture of HDD 400 allows processor 402 to set up a direct memory access (DMA) transfer between SRAM cache memory 406 and flash memories 420$a$0, 420$a$1, through 420$a$N. In one embodiment, flash memories 420$a$0, 420$a$1, through 420$a$N may be Flash/Magnetoresistive Random Access Memory (MRAM) chips. In addition, HDD 400 comprises supercap 424, which provides emergency power to processor 402, NVS 416, and SRAM memory cache 406.

Figure 5:
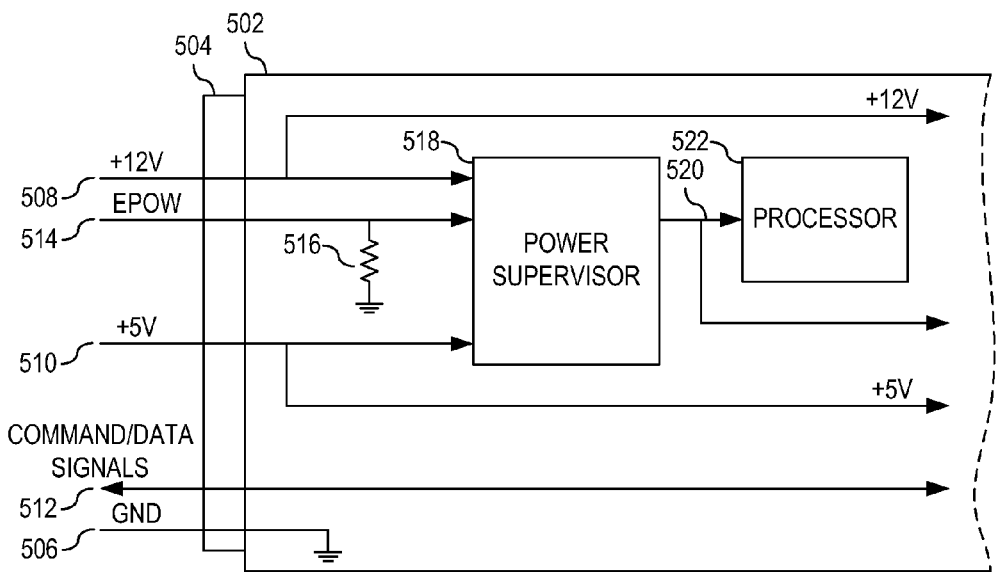
FIG. 5 depicts an example of a voltage monitoring circuit used to determine when to initiate a process of saving static random access memory (SRAM) cache data in accordance with an illustrative embodiment.

FIG. 5 depicts an example of a voltage monitoring circuit used to determine when to initiate a process of saving static random access memory (SRAM) cache data in accordance with an illustrative embodiment. Hard disk drive (HDD) 502 comprises backplane connector 504 which plugs into the backplane of an HDD bay. In an alternate embodiment, HDD 502 is mounted removably in an HDD carrier, such that backplane connector 504 for HDD 502 connects to the connector of the HDD carrier, which in turn has a connector, which mates with a backplane. Backplane connector 504 comprises ground connector 506, +12 volt power connection 508, +5 volt power connection 510, and command/data signals 512 as known in the art.

Additionally, signal Emergency Power (EPOW) signal 514 connects through backplane connector 504. EPOW signal 514 is negative true and is driven through the backplane by the system as warning that an emergency power-off event is pending. In the event that EPOW signal 514 is not driven high by the backplane or when HDD 502 is disengaged from the backplane, pull down resistor 516 pulls EPOW signal 514 low or active. Power supervisor 518 monitors +12 volt power connection 508, +5 volt power connection 510, and EPOW signal 514. If either +12 volt power connection 508 or +5 volt power connection 510 falls below its marginal level or if EPOW signal 514 is asserted, power event signal 520 is asserted, notifying processor 522 that a power event is occurring.

Figure 6:
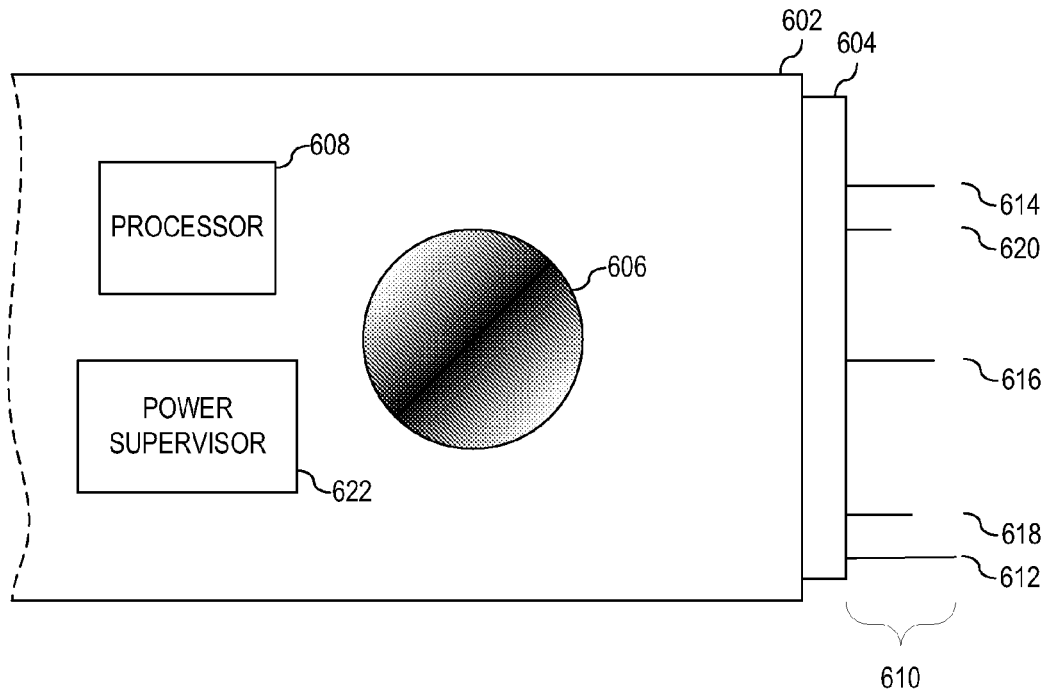
FIG. 6 depicts one example of a physical implementation of a backplane connector as part of a hard disk drive (HDD) in accordance with an illustrative embodiment.

FIG. 6 depicts one example of a physical implementation of a backplane connector as part of a hard disk drive (HDD) in accordance with an illustrative embodiment. As depicted, HDD 602 comprises backplane connector 604, rotating magnetic disk 606, processor 608, and power supervisor 622. Pins 610 on backplane connector 604 may have various lengths, so that as HDD 602 is inserted into a drive bay, connections may be made in a predetermined order. In the depicted example, circuit ground pin 612 makes contact first, thereby dispelling any voltage charge in the assembly of HDD 602. Then, power pins 614 and 616 make contact ensuring circuitry is powered before command/data pin 618 makes contact. In addition to these pins, HDD 602 also has Emergency Power (EPOW) pin 620, which may be shorter than all other pins. EPOW pin 620 is the last to make contact and the first to disengage when HDD 602 is removed from the HDD bay. Consequently, EPOW signal provided through EPOW pin 620 serves as both an early removal warning signal and as means for the system to notify HDD 602 that an emergency power event is occurring. That is, the shorter length of EPOW pin 620 within pins 610 provides a discrete signal to HDD 602 that indicates removal of HDD 602 from the backplane prior to power being completely lost or an early power down event from the system backplane.

Figure 7:
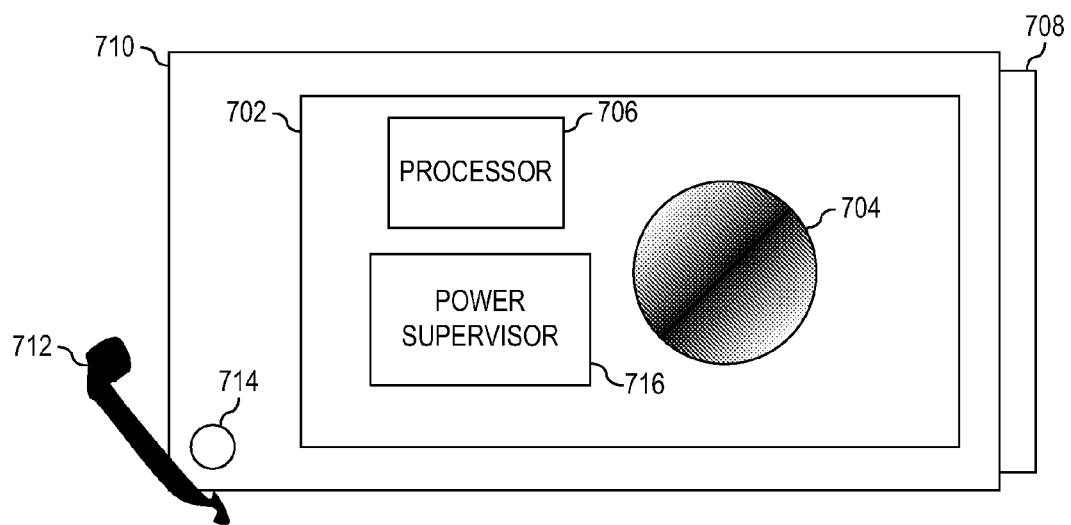
FIG. 7 depicts an alternate example of a physical implementation of a backplane connector as part of a hard disk drive (HDD) in accordance with an illustrative embodiment.

FIG. 7 depicts an alternate example of a physical implementation of a backplane connector as part of a hard disk drive (HDD) in accordance with an illustrative embodiment. As depicted, HDD 702 comprises rotating magnetic disk 704, processor 706, and power supervisor 716. However, in this embodiment, backplane connector 708 is part of HDD carrier 710, in which HDD 702 is mounted. HDD carrier 710 comprises cam level 712, which slowly locks and unlocks HDD carrier 710 into and out of an HDD bay. In the depicted example, cam position sensor 714 may be used to notify the power supervisor 716 and processor 706 of an impending hard disk drive removal as part of an alternate early-removal notification mechanism.

Figure 8:
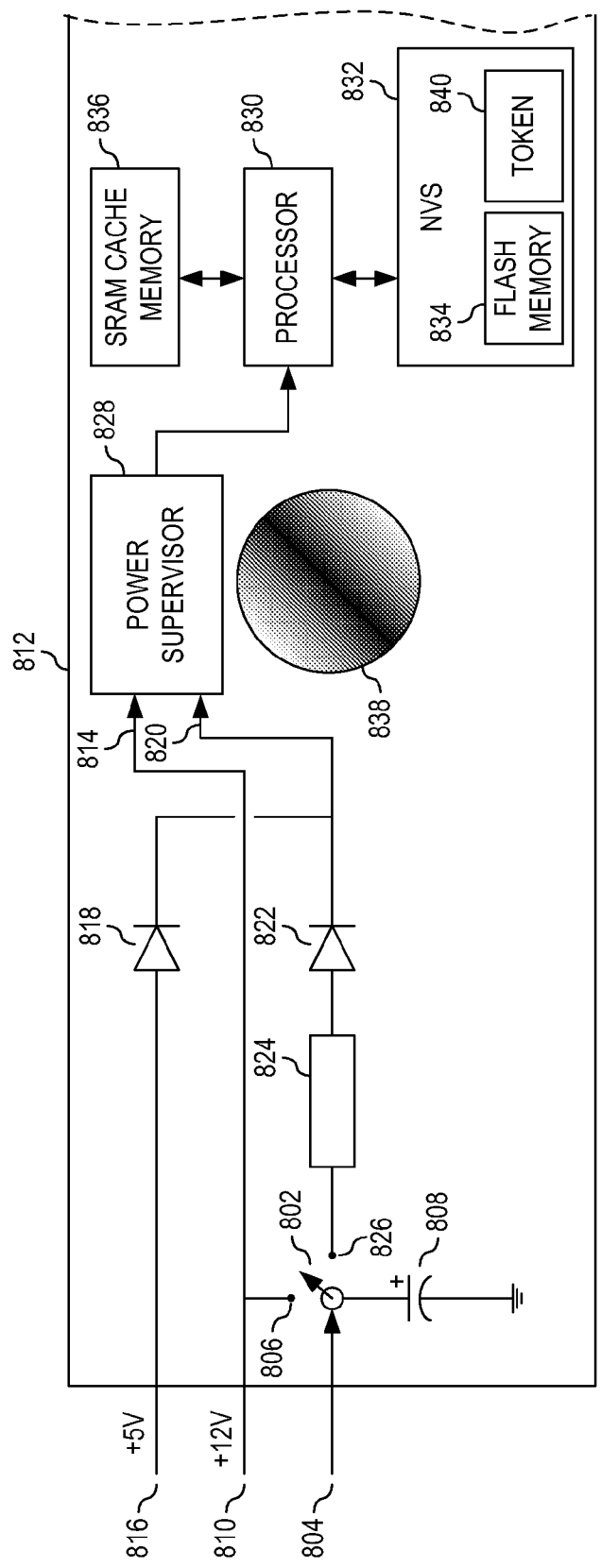
FIG. 8 depicts an example of a firehose dump switching circuitry for a hard disk drive (HDD) in accordance with an illustrative embodiment.

FIG. 8 depicts an example of a firehose dump switching circuitry for a hard disk drive (HDD) in accordance with an illustrative embodiment. In normal operation, switch 802 is held high by power event signal 804 which couples switch 802 to contact 806. By switch 802 being coupled to contact 806, supercap 808 is charged by +12 volt power 810 through switch 802. In the illustrative embodiment, supercap 808 capacitively stores +12 volt power 810 which is a higher voltage than will be required for firehose dumping by processor 830, thereby increasing the time power may be supplied to firehose dump the data from static random access memory (SRAM) cache memory 836 to corresponding locations in flash memory 834. Also in normal operation, +12 volt power 810 supplies +12 volts to power supervisor 828, processor 830, and other components of HDD 812 as is indicated by arrow 814 and +5 volt power 816 supplies +5 volts to power supervisor 828, processor 830, and other components of HDD 812 through diode 818 as is indicated by arrow 820. Diode 822 prevents current from draining back through the currently unpowered voltage regulator 824.

During a power event where +12 volt power 810 and/or +5 volt power 816 fall below a marginal voltage level, or fall to substantially zero, power event signal 804, which normally holds switch 802 high and disconnects switch 802 from voltage regulator 824, signals switch 802 to go to a low state which then connects supercap 808 to contact 826 and then to voltage regulator 824. Voltage regulator 824 converts or reduces the voltage supplied from supercap 808 to +5V volts, which is provided as in input to diode 822. Diode 822 will then provide +5 volts to power supervisor 828, processor 830, and other components of HDD 812 static random access memory (SRAM) data may be saved to flash memory. During the power event diode 818 prevents current from draining back through to any circuitry normally providing +5 volt power 816. Because supercap 808 may store a relatively large amount of energy, supercap 808 extends the time that the +5 volt power stays viable to the power supervisor as well as other components of HDD 812 so that all the SRAM data may be saved to flash memory.

During a power event and with power being supplied from supercap 808 via voltage regulator 824 and diode 822, processor 830 suspends command processing. Processor 830 may also receive a separate indication of the power event from power event signal 804. Once processor 830 receives the signal of the power event, processor 830 sets token 840 in non-volatile storage (NVS) 832 indicating that flash memory 834 in NVS 832 contains modified data. Token 840 may be a predetermined value stored in a predetermined location that is not likely to be present otherwise. Processor 830 then copies a portion of the SRAM cache table containing information on the modified data in SRAM cache memory 836, which may be referred to as a hot list, to flash memory 834. While SRAM cache memory 836 may contain data that has been modified as well as data that has not been modified, the illustrative embodiment pertains to the data that has been modified. Thus, the portion of the SRAM cache table that is copied comprises logical block addresses associated with data that has been modified, i.e. the hot list. Using the hot list, processor 830 initializes a cache block pointer to point to a first logical block address (LBA) in SRAM cache memory 836. Processor 830 copies the data stored in SRAM cache memory 836 that are associated with the LBA pointed at by the cache block pointer in the hot list to flash memory 834 at the address that corresponds to the address where it was stored in SRAM cache memory 836. When processor 830 finishes copying the data associated with the first LBA, processor 830 changes the cache block pointer to the next LBA in SRAM cache memory 836 and copies the data stored in SRAM cache memory 836 that are associated with the LBA pointed at by the cache block pointer in the hot list to flash memory 834 at an address that corresponds to the address where the data was stored in SRAM cache memory 836.

As each data copy is completed, processor 830 checks whether the data for all cached LBAs in the hot list have been copied from SRAM cache memory 836 to the corresponding locations in flash memory 834. Once processor 830 copies the data for all of the LBAs on the hot list from SRAM cache memory 836 to flash memory 834, processor 830 checks whether the power event that initiated the copy is still present. If processor 830 determines that the power event is still active, processor 830 shuts down HDD 812 by parking the read/write heads, spinning down rotating magnetic disk 838, and presenting a permanent error sense data that indicate that a non-recoverable error has occurred to all hosts with outstanding commands.

If processor 830 determines that the power event is no longer active, processor 830 writes the data in SRAM cache memory 836 to rotating magnetic disk 838. Once the data are safely stored on rotating magnetic disk 838, the copy of the data is no longer needed in flash memory 834. Thus, processor 830 erases all the data stored in flash memory 834 in NVS 832. Because flash memory 834 must be erased before processor 830 writes to flash memory 834 again, processor 830 erasing flash memory 834 at this point provides for a subsequent power event. That is, flash memory 834 is erased and ready to be written to immediately. Processor 830 then sets token 840 in non-volatile storage (NVS) 832 indicating flash memory 834 has been erased.

Processor 830 then checks whether a new power event is indicated. If a power event is not present, processor 830 checks whether the number of power events has exceeded a predetermined threshold. If the number of power events has not exceeded the threshold, processor 830 creates sense data indicating that a temporary power event was detected. Processor 830 presents the sense data to each host that interacts with HDD 812 on the next command sent and presents the sense data to each host that has an outstanding command awaiting execution. Processor 830 then resumes normal command processing which includes monitoring for further power events.

If processor 830 determines that a new power event has occurred or if the number of power events has exceeded the threshold, processor 830 shuts down HDD 812 by parking the read/write heads, spinning down rotating magnetic disk 838, and presents a permanent error sense data that indicate that a non-recoverable error has occurred to all hosts with outstanding commands.

When HDD 812 is re-initialized from a shut down or initialized upon power-on, processor 830 boots-up and then spins-up rotating magnetic disk 838. Processor 830 then analyzes NVS 832 to determine if token 840 indicates that there is modified data in flash memory 834 from a previous shut down due to a power event. If token 840 indicates that there is modified data in flash memory 834, processor 830 copies the hot list from flash memory 834 to SRAM cache memory 836. Processor 830 initializes a cache block pointer to the location of the first LBA data in the hot list. Processor 830 then copies corresponding LBA data from flash memory 834 to SRAM cache memory 836 at a corresponding address. When processor 830 finishes copying the data associated with the first LBA, processor 830 changes the cache block pointer to the next LBA in flash memory 834 and copies the data stored in flash memory 834 that are associated with the LBA pointed to by the cache block pointer in the hot list to SRAM cache memory 836 at an address that corresponds to the address where the information was stored in flash memory 834.

As each data copy is completed, processor 830 checks whether the data for all cached LBAs in the hot list have been copied from flash memory 834 to the corresponding locations in SRAM cache memory 836. Once processor 830 copies the data for all of the LBAs on the hot list from flash memory 834 to SRAM cache memory 836, processor 830 writes the modified data in SRAM cache memory 836 to rotating magnetic disk 838. Once the data are safely on rotating magnetic disk 838, the copy of the data is no longer needed in flash memory 834. Thus, processor 830 erases all the data stored in flash memory 834 in NVS 832. Because flash memory 834 must be erased before processor 830 writes to flash memory 834 again, processor 830 erases flash memory 834 at this point, which provides for a subsequent power event, as flash memory 834 is erased and ready to be written to immediately. Processor 830 then sets token 840 in non-volatile storage (NVS) 832 indicating flash memory 834 has been erased.

If during initialization token 840 indicates that there are no modified data in flash memory 834, processor 830 determines if token 840 indicates that flash memory 834 has been erased. If token 840 does not indicate that flash memory 834 has been erased, then processor 830 erases all the data stored in flash memory 834 in NVS 832. Processor 830 then sets token 840 in non-volatile storage (NVS) 832 indicating flash memory 834 has been erased. If during initialization token 840 indicates that flash memory 834 has been erased, processor 830 begins normal command processing which includes monitoring for further power events.

Figure 9:
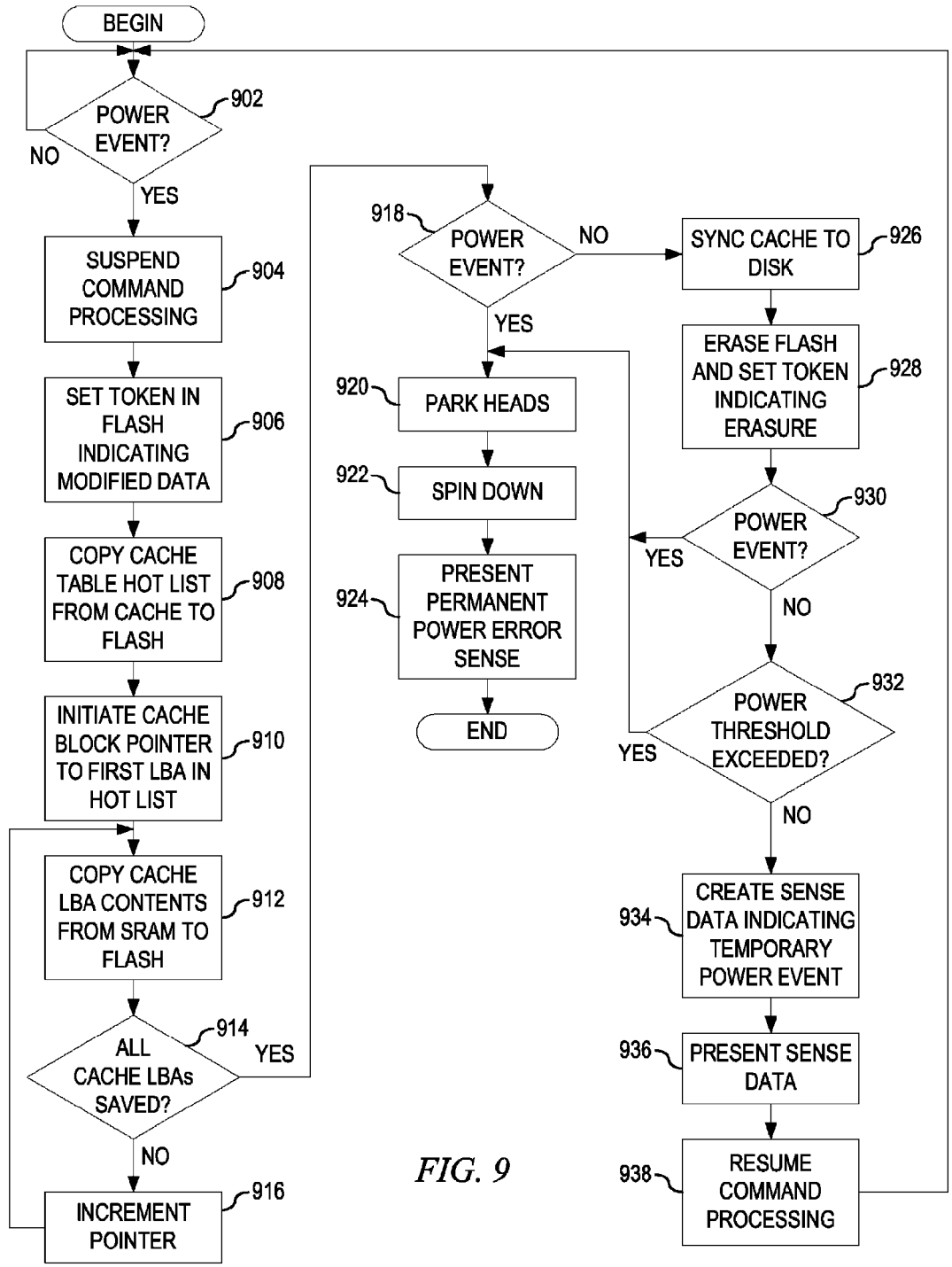
FIG. 9 depicts an example of the operation performed by a processor in firehose dumping SRAM cache data to non-volatile memory in accordance with an illustrative embodiment.

FIG. 9 depicts an example of the operation performed by a processor in firehose dumping SRAM cache data to non-volatile memory in accordance with an illustrative embodiment. As the operation begins, a processor in a hard disk drive determines if an indication has been received of a power event via a power event signal (step 902). The power event may be indicative of a +12 volt power connection or a +5 volt power connection falling below a marginal level or an Emergency Power signal being asserted through the removal of the hard disk drive (HDD) and the shorter length of the EPOW pin providing a discrete signal to the HDD that indicates removal of the HDD from the backplane prior to power being completely lost. If at step 902 an indication has not been received, then the process returns to step 902. If at step 902 the processor receives a signal of a power event, the processor suspends command processing (step 904). The processor then sets a token in a non-volatile storage (NVS) indicating that a flash memory in the NVS contains modified data (step 906). The processor then copies a portion of a SRAM cache table containing information on the modified data in a SRAM cache memory, which may be referred to as a hot list, to the flash memory (step 908).

Using the hot list, the processor initializes a cache block pointer to point to a first logical block address (LBA) in the SRAM cache memory (step 910). The processor copies the data stored in the SRAM cache memory that is associated with the LBA pointed at by the cache block pointer in the hot list to the flash memory at the address that corresponds to the address where it was stored in the SRAM cache memory (step 912). When the processor finishes copying the data associated with the first LBA, the processor determines if all cached LBAs in the hot list have been saved from the SRAM cache memory to corresponding locations in the flash memory (step 914). If at step 914 all cached LBAs in the hot list have not been copied from the SRAM cache memory to corresponding locations in the flash memory, the processor increments the cache block pointer to the next LBA in the SRAM cache memory (step 916) with the operation returning to step 912 thereafter.

If at step 914 all cached LBAs in the hot list have been copied from the SRAM cache memory to corresponding locations in the flash memory, the processor checks whether the power event that initiated the copy is still present (step 918). If at step 918 the processor determines that the power event is still active, the processor shuts down the hard disk drive by parking the read/write heads (step 920), spinning down the rotating magnetic disk (step 922), and presenting a permanent error sense data that indicates that a non-recoverable error has occurred to all hosts with outstanding commands (step 924), with the operation terminating thereafter.

If at step 918 the processor determines that the power event is no longer active, the processor synchronizes the data in the SRAM cache memory with the rotating magnetic disk by writing the data in the SRAM cache memory to the rotating magnetic disk (step 926). Once the data is safely stored on the rotating magnetic disk and the copy of the data is no longer needed in the flash memory, the processor erases all the data stored in the flash memory in the NVS and sets a token in the NVS indicating that the flash memory has been erased (step 928). The processor then checks whether a new power event is indicated (step 930). If at step 930 a new power event is not present, the processor checks whether the number of power events has exceeded a predetermined threshold (step 932). If at step 932 the number of power events has not exceeded the predetermined threshold, the processor creates sense data indicating that a temporary power event was detected (step 934).

The processor presents the sense data to each host that interacts with the HDD on the next command sent and to each host that has an outstanding command awaiting execution (step 936). The processor then resumes normal command processing which includes monitoring for further power events (step 938), with the operation returning to step 902 thereafter. If at step 930 the processor determines that a new power event has occurred or if at step 932 the processor determines that the number of power events has exceeded the predetermined threshold, the operation proceeds to step 920.

Figure 10:
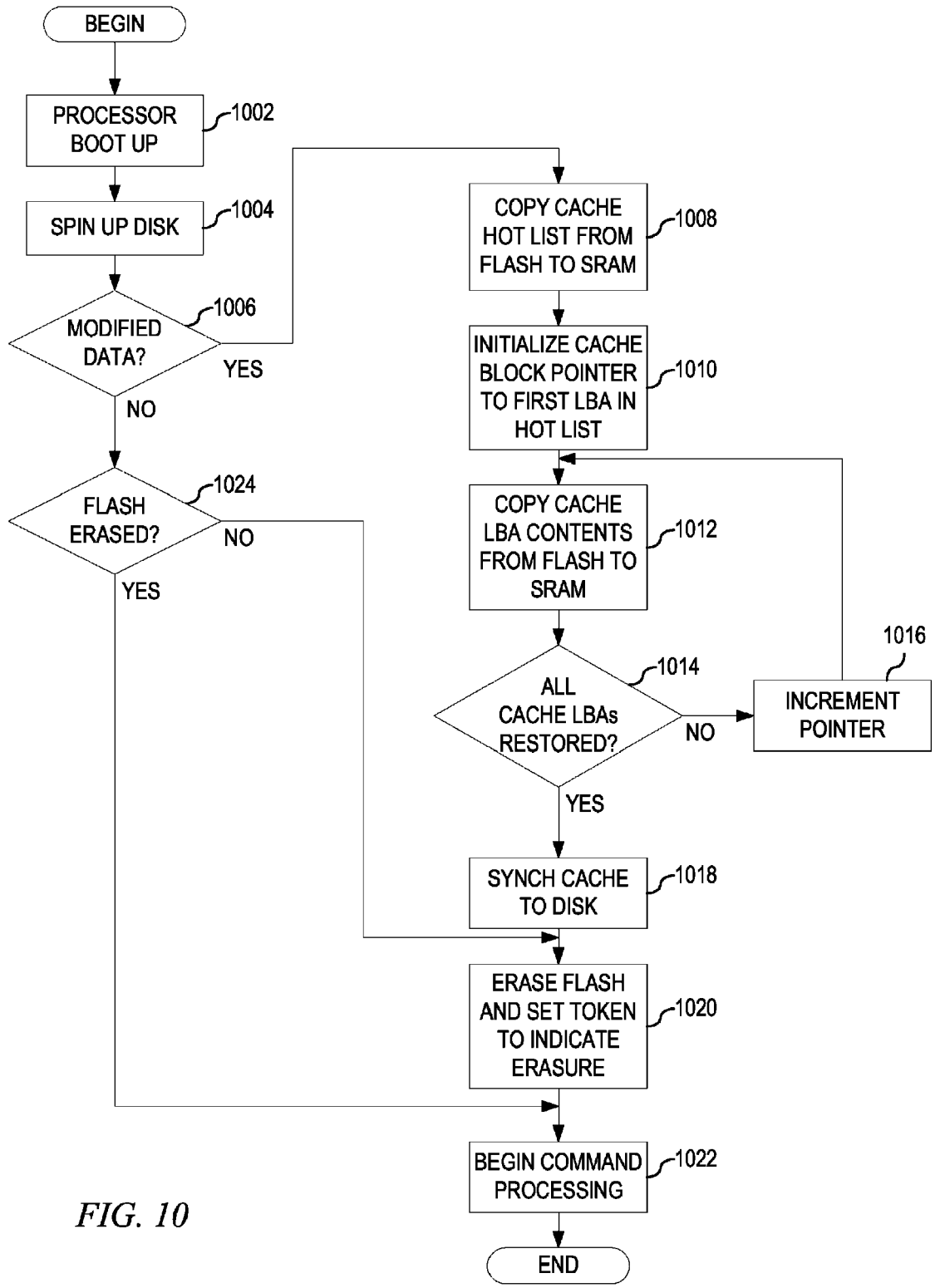
FIG. 10 depicts an example of the operation performed by a processor when a hard disk drive (HDD) is re-initialized from a shut down or initialized upon power-on in accordance with an illustrative embodiment.

FIG. 10 depicts an example of the operation performed by a processor when a hard disk drive (HDD) is re-initialized from a shut down or initialized upon power-on in accordance with an illustrative embodiment. As the operation begins, the processor in the hard disk drive boots-up (step 1002) and then the processor spins-up the rotating magnetic disk of the hard disk drive (step 1004). The processor then analyzes the nonvolatile storage (NVS) of the hard disk drive to determine if a token in the NVS indicates that there is modified data in the flash memory of the NVS from a previous shut down due to a power event (step 1006). If at step 1006 the processor determines that the token indicates that there is modified data in the flash memory, the processor copies the hot list from the flash memory to the SRAM cache memory of the hard disk drive (step 1008).

The processor then initializes a cache block pointer to the location of the first LBA data in the hot list (step 1010). The processor then copies corresponding LBA data from the flash memory to the SRAM cache memory at a corresponding address (step 1012). When the processor finishes copying the data associated with the first LBA, the processor checks whether the data for all cached LBAs in the hot list has been copied from the flash memory to the corresponding locations in the SRAM cache memory (step 1014). If at step 1014 the processor determines that all cached LBAs in the hot list have not been copied from the flash memory to the corresponding locations in the SRAM cache memory, then the processor increments the cache block pointer to the next LBA in the flash memory and copies the data stored in the flash memory that is associated with the LBA pointed to by the cache block pointer in the hot list to the SRAM cache memory at an address that corresponds to the address where the information was stored in the flash memory (step 1016), with the operation returning to step 1012 thereafter.

If at step 1014 the processor determines that all cached LBAs in the hot list has been copied from the flash memory to the corresponding locations in the SRAM cache memory, the processor synchronizes the data in the SRAM cache memory to the rotating magnetic disk by writing the modified data in the SRAM cache memory to the rotating magnetic disk (step 1018). Once the data is safely on the rotating magnetic disk and the copy of the data is no longer needed in the flash memory, the processor erases all the data stored in the flash memory and sets a token in the NVS indicating that the flash memory has been erased (step 1020). The processor then begins normal command processing which includes monitoring for further power events (step 1022), with the operation terminating thereafter.

If at step 1006 the processor determines that the token indicates that there is no modified data in the flash memory, the processor determines if the token indicates that the flash memory has been erased (step 1024). If at step 1024 the processor determines that the token indicates that the flash memory has not been erased, then the operation proceeds to step 1020. If at step 1024 the processor determines that the token indicates that the flash memory has been erased, then the operation proceeds to step 1022.

Thus, the illustrative embodiments provide mechanisms for using a supercap to perform a firehose dump of static random access memory (SRAM) write cache data to nonvolatile memory. The illustrative embodiments incorporate an array of Flash controllers and an array of Flash chips to construct a nonvolatile store (NVS) that provides high speed access with data security to do a fire hose dump of the write data that remains in the SRAM memory cache. The illustrative embodiments use a super capacitor to keep power to the processor, SRAM memory cache, and the Flash while the fire hose dump is completed.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for firehose dumping modified data in a static random access memory of a hard disk drive to non-volatile memory of the hard disk drive during a power event, the method comprising:
   receiving an indication of the power event in the hard disk drive;
   suspending command processing in the hard disk drive;
   setting a token in the non-volatile storage indicating that a flash memory in the non-volatile memory contains the modified data;
   copying a portion of a static random access memory cache table containing information on the modified data in the static random access memory to the flash memory;
   copying the modified data from the static random access memory to the flash memory, wherein copying the modified data from the static random access memory to the flash memory further comprises:
      initializing a cache block pointer to point to a first logical block address of the modified data in the static random access memory;
      copying the modified data stored in the static random access memory that is associated with the first logical block address pointed to by the cache block pointer to the flash memory at an address that corresponds to an address where the modified data is stored in the static random access memory;
      determining whether all cached logical block addresses have been copied from the static random access memory to corresponding locations in the flash memory;
      responsive to all of the cached logical block addresses failing to have been copied from the static random access memory to the corresponding locations in the flash memory, incrementing the cache block pointer to the next logical block address in the static random access memory;
      copying the modified data stored in the static random access memory that is associated with the next logical block address pointed to by the cache block pointer to the flash memory at an address that corresponds to an address where the modified data is stored in the static random access memory; and
      repeating the incrementing and copying steps until all of the cached logical block addresses have been copied from the static random access memory to corresponding locations in the flash memory;
   determining whether the power event that initiated the copy of the modified data in the static random access memory to the flash memory is still present; and
   responsive to the power event that initiated the copy still being present, shutting down the hard disk drive.

2. The method of claim 1, wherein the indication of the power event is initiated by at least one of a +12 volt power connection falling below a marginal level associated with the +12 volt power connection, a +5 volt power connection falling below a marginal level associated with the +5 volt power connection, or an Emergency Power discrete signal being asserted, wherein the Emergency Power discrete signal is initiated based the removal of the hard disk drive from a backplane due to an Emergency Power pin in a set of pins on the hard disk drive being a first pin to be disconnected because the Emergency Power pin is the shortest pin in the set of pins.

3. The method of claim 1, wherein the hard disk drive is powered by a supercap during the power event so that the modified data is copied from the static random access memory to the flash memory, wherein the supercap capacitively stores a higher voltage than is required by the hard disk drive to copy the modified data stored in the static random access memory to the flash memory, and wherein a voltage regulator in the hard disk drive reduces the higher voltage supplied by the supercap to a voltage that is usable by the hard disk drive to copy the modified data stored in the static random access memory to the flash memory.

4. The method of claim 1, wherein shutting down the hard disk drive further comprises:
   parking read/write heads of the hard disk drive;
   spinning down a rotating magnetic disk of the hard disk drive; and
   presenting permanent error sense data that indicates that a non-recoverable error has occurred to all hosts with outstanding commands.

5. The method of claim 1, further comprising:
   responsive to the power event that initiated the copy failing to be present, synchronizing the modified data in the static random access memory with a rotating magnetic disk of the hard disk drive;
   erasing all data stored in the flash memory;
   setting the token in the non-volatile memory to indicate that the flash memory has been erased;
   determining whether a new power event has occurred;
   responsive to an absence of the new power event, determining whether a number of power events exceeds a predetermined threshold for power events;
   responsive to the number of power events failing to exceed the predetermined threshold for power events, creating sense data that indicates a temporary power event was detected;
   presenting the sense data to each host that interacts with the hard disk drive on a next command sent by the hard disk drive to each host;
   presenting the sense data to each host that has an outstanding command awaiting execution with the hard disk drive; and
   resuming normal command processing.

6. The method of claim 5, further comprising:
   responsive to an existence of the new power event or responsive to the number of power events exceeding the predetermined threshold for power events, shutting down the hard disk drive, wherein shutting down the hard disk drive further comprises:
   parking read/write heads of the hard disk drive;
   spinning down a rotating magnetic disk of the hard disk drive; and
   presenting permanent error sense data that indicates that a non-recoverable error has occurred to all hosts with outstanding commands.

7. The method of claim 1, further comprising:
   responsive to the hard disk drive being initialized, booting up a processor in the hard disk drive;
   spinning-up a rotating magnetic disk of the hard disk drive;
   determining whether a token in the non-volatile storage indicates the modified data in the flash memory;
   responsive to the modified data existing in the flash memory, copying the portion of the static random access memory cache table in the flash memory to the static random access memory;
   copying the modified data from the flash memory to the static random access memory;
   erasing all data stored in the flash memory;
   setting the token in the non-volatile memory to indicate that the flash memory has been erased; and
   resuming normal command processing.

8. The method of claim 7, further comprising:
responsive to the modified data failing to exist in the flash memory, determining whether the token in the non-volatile storage indicates that the flash memory has been erased;
responsive to the token indicating that the flash memory has not been erased, erasing all data stored in the flash memory;
setting the token in the non-volatile memory to indicate that the flash memory has been erased; and
resuming normal command processing.

9. The method of claim 8, further comprising:
responsive to the token indicating that the flash memory has been erased, resuming normal command processing.

10. An apparatus, comprising:
a processor; and
a memory coupled to the processor, wherein the memory comprises instructions which, when executed by the processor, cause the processor to:
receive an indication of the power event in the hard disk drive;
suspend command processing in the hard disk drive;
set a token in the non-volatile storage indicating that a flash memory in the non-volatile memory contains the modified data;
copy a portion of a static random access memory cache table containing information on the modified data in the static random access memory to the flash memory;
copy the modified data from the static random access memory to the flash memory, wherein the instructions to copy the modified data from the static random access memory to the flash memory further cause the processor to:
  initialize a cache block pointer to point to a first logical block address of the modified data in the static random access memory;
  copy the modified data stored in the static random access memory that is associated with the first logical block address pointed to by the cache block pointer to the flash memory at an address that corresponds to an address where the modified data is stored in the static random access memory;
  determine whether all cached logical block addresses have been copied from the static random access memory to corresponding locations in the flash memory;
  responsive to all of the cached logical block addresses failing to have been copied from the static random access memory to the corresponding locations in the flash memory, increment the cache block pointer to the next logical block address in the static random access memory;
  copy the modified data stored in the static random access memory that is associated with the next logical block address pointed to by the cache block pointer to the flash memory at an address that corresponds to an address where the modified data is stored in the static random access memory; and
  repeat the incrementing and copying steps until all of the cached logical block addresses have been copied from the static random access memory to corresponding locations in the flash memory;
determine whether the power event that initiated the copy of the modified data in the static random access memory to the flash memory is still present; and
responsive to the power event that initiated the copy still being present, shut down the hard disk drive.

11. The apparatus of claim 10, wherein the indication of the power event is initiated by at least one of a +12 volt power connection falling below a marginal level associated with the +12 volt power connection, a +5 volt power connection falling below a marginal level associated with the +5 volt power connection, or an Emergency Power discrete signal being asserted, wherein the Emergency Power discrete signal is initiated based the removal of the hard disk drive from a backplane due to an Emergency Power pin in a set of pins on the hard disk drive being a first pin to be disconnected because the Emergency Power pin is the shortest pin in the set of pins.

12. The apparatus of claim 10, wherein the hard disk drive is powered by a supercap during the power event so that the modified data is copied from the static random access memory to the flash memory, wherein the supercap capacitively stores a higher voltage than is required by the hard disk drive to copy the modified data stored in the static random access memory to the flash memory, and wherein a voltage regulator in the hard disk drive reduces the higher voltage supplied by the supercap to a voltage that is usable by the hard disk drive to copy the modified data stored in the static random access memory to the flash memory.

13. The apparatus of claim 10, wherein the instructions to shut down the hard disk drive further cause the processor to:
park read/write heads of the hard disk drive;
spin down a rotating magnetic disk of the hard disk drive; and
present permanent error sense data that indicates that a non-recoverable error has occurred to all hosts with outstanding commands.

14. The apparatus of claim 10, wherein the instructions further cause the processor to:
responsive to the power event that initiated the copy failing to be present, synchronize the modified data in the static random access memory with a rotating magnetic disk of the hard disk drive;
erase all data stored in the flash memory;
set the token in the non-volatile memory to indicate that the flash memory has been erased;
determine whether a new power event has occurred;
responsive to an absence of the new power event, determine whether a number of power events exceeds a predetermined threshold for power events;
responsive to the number of power events failing to exceed the predetermined threshold for power events, create sense data that indicates a temporary power event was detected;
present the sense data to each host that interacts with the hard disk drive on a next command sent by the hard disk drive to each host;
present the sense data to each host that has an outstanding command awaiting execution with the hard disk drive; and
resume normal command processing.

15. The apparatus of claim 14, wherein the instructions further cause the processor to:
responsive to an existence of the new power event or responsive to the number of power events exceeding the predetermined threshold for power events, shut down the hard disk drive, wherein the instructions to shut down the hard disk drive further cause the processor to:
park read/write heads of the hard disk drive;
spin down a rotating magnetic disk of the hard disk drive; and
present permanent error sense data that indicates that a non-recoverable error has occurred to all hosts with outstanding commands.

16. The apparatus of claim 10, wherein the instructions further cause the processor to:
- responsive to the hard disk drive being initialized, boot up a processor in the hard disk drive;
- spin-up a rotating magnetic disk of the hard disk drive;
- determine whether a token in the non-volatile storage indicates the modified data in the flash memory;
- responsive to the modified data existing in the flash memory, copy the portion of the static random access memory cache table in the flash memory to the static random access memory;
- copy the modified data from the flash memory to the static random access memory;
- erase all data stored in the flash memory;
- set the token in the non-volatile memory to indicate that the flash memory has been erased; and
- resume normal command processing.

17. The apparatus of claim 16, wherein the instructions further cause the processor to:
- responsive to the modified data failing to exist in the flash memory, determine whether the token in the non-volatile storage indicates that the flash memory has been erased;
- responsive to the token indicating that the flash memory has been erased, resume normal command processing;
- responsive to the token indicating that the flash memory has not been erased, erase all data stored in the flash memory;
- set the token in the non-volatile memory to indicate that the flash memory has been erased; and
- resume normal command processing.

18. A computer program product comprising a non-transitory computer readable storage medium having a computer readable program recorded thereon, wherein the computer readable program, when executed on a computing device, causes the computing device to:
- receive an indication of the power event in the hard disk drive;
- suspend command processing in the hard disk drive;
- set a token in the non-volatile storage indicating that a flash memory in the non-volatile memory contains the modified data;
- copy a portion of a static random access memory cache table containing information on the modified data in the static random access memory to the flash memory;
- copy the modified data from the static random access memory to the flash memory, wherein the computer readable program to copy the modified data from the static random access memory to the flash memory further causes the computing device to:
  - initialize a cache block pointer to point to a first logical block address of the modified data in the static random access memory;
  - copy the modified data stored in the static random access memory that is associated with the first logical block address pointed to by the cache block pointer to the flash memory at an address that corresponds to an address where the modified data is stored in the static random access memory;
  - determine whether all cached logical block addresses have been copied from the static random access memory to corresponding locations in the flash memory;
  - responsive to all of the cached logical block addresses failing to have been copied from the static random access memory to the corresponding locations in the flash memory, increment the cache block pointer to the next logical block address in the static random access memory;
  - copy the modified data stored in the static random access memory that is associated with the next logical block address pointed to by the cache block pointer to the flash memory at an address that corresponds to an address where the modified data is stored in the static random access memory; and
  - repeat the incrementing and copying steps until all of the cached logical block addresses have been copied from the static random access memory to corresponding locations in the flash memory;
- determine whether the power event that initiated the copy of the modified data in the static random access memory to the flash memory is still present; and
- responsive to the power event that initiated the copy still being present, shut down the hard disk drive.

19. The computer program product of claim 18, wherein the computer readable program further causes the computing device to:
- responsive to the power event that initiated the copy failing to be present, synchronize the modified data in the static random access memory with a rotating magnetic disk of the hard disk drive;
- erase all data stored in the flash memory;
- set the token in the non-volatile memory to indicate that the flash memory has been erased;
- determine whether a new power event has occurred;
- responsive to an absence of the new power event, determine whether a number of power events exceeds a predetermined threshold for power events;
- responsive to the number of power events failing to exceed the predetermined threshold for power events, create sense data that indicates a temporary power event was detected;
- present the sense data to each host that interacts with the hard disk drive on a next command sent by the hard disk drive to each host;
- present the sense data to each host that has an outstanding command awaiting execution with the hard disk drive; and
- resume normal command processing.

20. The computer program product of claim 18, wherein the computer readable program further causes the computing device to:
- responsive to an existence of the new power event or responsive to the number of power events exceeding the predetermined threshold for power events, shut down the hard disk drive, wherein the instructions to shut down the hard disk drive further cause the processor to:
- park read/write heads of the hard disk drive;
- spin down a rotating magnetic disk of the hard disk drive; and
- present permanent error sense data that indicates that a non-recoverable error has occurred to all hosts with outstanding commands.

* * * * *